US012731396B2

(12) United States Patent
Regensburger et al.

(10) Patent No.: US 12,731,396 B2
(45) Date of Patent: Sep. 8, 2026

(54) METHOD FOR IDENTIFYING A CHANGE IN TRUNCATION, CONTROL FACILITY, CT APPARATUS, COMPUTER PROGRAM AND ELECTRONICALLY READABLE DATA CARRIER

(71) Applicant: Siemens Healthcare GmbH, Erlangen (DE)

(72) Inventors: Alois Regensburger, Poxdorf (DE); Michael Manhart, Fürth (DE)

(73) Assignee: Siemens Healthineers AG, Forchheim (DE)

( * ) Notice: Subject to any disclaimer, the term of this patent is extended or adjusted under 35 U.S.C. 154(b) by 351 days.

(21) Appl. No.: 18/368,329

(22) Filed: Sep. 14, 2023

(65) Prior Publication Data

US 2024/0096089 A1 Mar. 21, 2024

(30) Foreign Application Priority Data

Sep. 16, 2022 (DE) ..................... 10 2022 209 764.5

(51) Int. Cl.
*G06V 10/98* (2022.01)
*G06T 12/30* (2026.01)

(52) U.S. Cl.
CPC ............ *G06V 10/993* (2022.01); *G06T 12/30* (2026.01); *G06T 2211/432* (2013.01)

(58) Field of Classification Search
CPC .............. G06V 10/993; G06V 2201/03; G06T 11/008; G06T 2211/432; G06T 11/005
See application file for complete search history.

(56) References Cited

U.S. PATENT DOCUMENTS 6,246,742 B1 * 6/2001 Besson ................. G06T 11/005 378/15
2011/0116697 A1 * 5/2011 Dafni .................... G06T 11/008 382/173

(Continued)

FOREIGN PATENT DOCUMENTS

DE 102013202478 A1 10/2013
DE 102014210420 A1 12/2015
DE 102015218596 A1 3/2017

*Primary Examiner* — Stephen R Koziol
*Assistant Examiner* — Michael Kim Maiden
(74) *Attorney, Agent, or Firm* — Lempia Summerfield Katz LLC

(57) ABSTRACT

The invention relates to a method for identifying a change in truncation of an examination object between first projection photographs of the examination object generated by a CT apparatus, and second projection photographs of the examination object generated by the CT apparatus, comprising the following steps to be carried out by a control facility. Receiving a first dataset, comprising the first projection photographs of the examination object; receiving a second dataset, comprising the second projection photographs of the examination object; correlating the first dataset with the second dataset; establishing the change in truncation of the examination object between the first projection photographs and the second projection photographs when satisfaction of at least one predefined change criterion between the datasets is captured; and outputting a predetermined output signal when the change in truncation between the first projection photographs and the second projection photographs is established.

20 Claims, 7 Drawing Sheets

(56) References Cited

U.S. PATENT DOCUMENTS

| | | | | |
|---|---|---|---|---|
| 2012/0275673 | A1 * | 11/2012 | Star-Lack | G06T 11/005 382/131 |
| 2013/0294568 | A1 * | 11/2013 | Lee | G06T 5/50 378/4 |
| 2017/0086767 | A1 | 3/2017 | Elsässer et al. | |
| 2017/0365075 | A1 * | 12/2017 | Meganck | G06T 11/006 |
| 2018/0018768 | A1 * | 1/2018 | Hsu | A61B 6/037 |

* cited by examiner 1
8
13,15
17
19
20
34
16
5
8
22
6
24
13,15
4
12
13,14
23
25
21
23
16
13,14
26
32
33
9
7
20
17
2
11
32
27
10
8
20
17
3

METHOD FOR IDENTIFYING A CHANGE IN TRUNCATION, CONTROL FACILITY, CT APPARATUS, COMPUTER PROGRAM AND ELECTRONICALLY READABLE DATA CARRIER

CROSS REFERENCE TO RELATED APPLICATIONS

This application claims the benefit of DE 10 2022 209 764.5 filed on Sep. 16, 2022, which is hereby incorporated by reference in its entirety.

FIELD

Embodiments relate to a method for identifying a change in truncation between first projection photographs of the examination object generated by a CT apparatus and second projection photographs of the examination object generated by the CT apparatus.

BACKGROUND

Cone beam computed tomography (CBCT) is an imaging method for generating a reconstruction mapping of an examination object. In cone beam computed tomography, X-ray radiation is emitted by an X-ray source onto the examination object, with a main beam area opening conically from the X-ray source. Located opposite the X-ray source is a flat panel detector that detects the emitted X-rays as a two-dimensional projection photograph of the examination object. The examination object is arranged between the X-ray source and the flat panel detector. To provide reconstruction of a reconstruction mapping of the examination object a dataset, including a plurality of the projection photographs of the examination object, is captured.

In order to capture the projection photographs of the examination object for the dataset, the X-ray source and the flat panel detector are moved around the examination object along a, usually round, trajectory. The respective projection photographs of the examination object are generated in respective settings along the trajectory. The dataset consequently includes a plurality of projection photographs, which map the examination object in different orientations. The projection photographs of the dataset are processed according to a predetermined reconstruction method in order to generate a reconstruction mapping of the examination object.

For an optimum reconstruction of the examination object, it is necessary that the examination object is penetrated by the X-rays in each of the settings. In other words, it is necessary that the entire examination object is located inside the conical main beam area during capture of the respective projection photograph.

The case may exist where missing areas of the examination object are located outside of the conical main beam area during capture of at least some of the projection photographs and these are thus not penetrated by the X-rays. These missing areas of the examination object are consequently not mapped in the respective projection photograph either. Owing to the absence of these missing areas of the examination object in some of the projection photographs errors may occur on reconstruction of the reconstruction mapping of the examination object, and the projection photographs errors manifest themselves in changes in the Hounsfield values, which describe the attenuation of the X-ray radiation due to passing through the examination object. This may be attributed to the fact that a path passed through by X-rays is incorrectly estimated in a reconstruction model, whereby the attenuation of the corresponding X-rays by the relevant missing areas is not taken into account.

Cone beam computed tomography is used, inter alia, to ascertain the quantitative distribution of an injected or administered contrast agent (for example, radiopaque iodine contrast agent). A widespread approach is digital 3D subtraction angiography-like subtraction of mask images and full images of the examination object. In this case, a first dataset including first projection photographs of the examination object is captured in a first measurement before the administration of the contrast agent, from which a reconstruction mapping of the examination object is generated as a mask. After administration of the contrast agent a second dataset including second projection photographs of the examination object is acquired in a second measurement, from which a reconstruction mapping of the examination object is generated as a full image. The mask is subtracted from the full image to highlight the distribution of the contrast agent in the examination object.

One problem with this application is that there are no quantitative Hounsfield units with cone beam computed tomography. One of the main causes of the uncertainty of the Hounsfield units is the previously described truncation, with parts of the scanned examination object being located outside of the main reconstruction volume and no adequate angle coverage and number of projection beams being obtained in one measuring process. If the truncation changes between the two measuring processes, the consequence of this is errors in the measured contrast distribution. In the case of selective internal beam therapy this results in a significant error in the image-based dosimetry.

Owing to this problem it is customary in certain cases to use conventional CT methods for quantitative measurements instead of cone beam computed tomography, and to use digital 3D-subtraction angiography or BodyPBV by contrast only for qualitative assessment.

A plurality of methods is known from the prior art in order to take into account the missing areas, which have not been radiographed, in the reconstruction of the 3D image of the examination object. The truncation is globally corrected and compensated, and this constitutes a challenging problem.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a simpler solution to the identification and compensation of a change in truncation.

A first aspect relates to a method for identifying a change in truncation of an examination object between first projection photographs of the examination object generated by a CT apparatus and second projection photographs of the examination object generated by the CT apparatus. In other words, the method is intended to identify that the truncation between the projection photographs of the two datasets differs. It may be provided, for example, that respective datasets were generated in two examinations, with one respective dataset including the respective projection photographs of the examination object. The projection photographs may be, for example, 2D photographs of the examination object, that were generated according to a cone beam computed tomography method.

A first one of the datasets may be provided for generating a mask photograph of the examination object that describes the examination object before the injection of a contrast agent. A second one of the datasets may be provided for generating a mask photograph of the examination object that describes the examination object after the injection of the contrast agent.

In a first step, the first dataset, which includes the first projection photographs of at least one region of interest of the examination object to be examined, may be received by a control facility. In other words, the control facility receives the first dataset. In this case it may be provided that the at least one predefined region of interest of the examination object is described by the dataset. The at least one predefined region of interest may predefine a predetermined limited area or a predetermined limited volume of the examination object. It may be provided, for example, that the first dataset describes the mask dataset that describes the examination object before an introduction of the contrast agent.

In a second step, the control facility may receive the second dataset, which includes the second projection photographs of the at least one region of interest of the examination object to be examined. The second dataset may include the second projection photographs, which map the at least one region of interest of the examination object to be examined. The second dataset may have been generated from the examination object by the same CT apparatus or a different CT apparatus after the introduction of the contrast agent into the examination object. The second projection photographs may be carried out in a separate capture process that may be different from a capture process for capturing the first projection photographs.

Conditions for taking the projection photographs of the examination object may have changed between the two measurements, so a change in truncation may exist between the first projection photographs and the second projection photographs. In a further step, it is therefore provided that the first dataset is correlated with the second dataset by way of the control facility.

In a further step it is provided that the control facility ascertains whether the truncation has changed between the projection photographs of the datasets. It is provided that the control facility establishes a change in truncation when the control facility captures the satisfaction of at least one predefined change criterion between the datasets. In other words, the change in truncation is established when the at least one predefined change criterion between the datasets is satisfied. The at least one predefined change criterion may affect, for example, indicators, which may point to a change in truncation.

It is provided that a predetermined output signal about the change in truncation is output when the control facility establishes the change in truncation between the datasets. The signal may be, for example, an electronic signal, which may initiate, for example, a predetermined output by a user interface.

Embodiments provide a simple and more robust method for identifying and correcting changes in the truncation, which method reacts more sensitively to slight changes and is less model-dependent.

In addition, or alternatively, compensation of the change in truncation is provided. In addition to or as an alternative to capturing the change in truncation, the control facility compensates the change in truncation between the first projection photograph and the second projection photograph according to at least one predetermined compensation method. In other words, it is provided that the control facility applies the predetermined compensation method to projection photographs of at least one of the datasets in order to at least partially compensate the change in truncation between the projection photographs of the datasets. The development results in the advantage that the change in truncation between the projection photographs of the datasets may be removed or at least attenuated. It may also be provided that the control facility compensates the change in truncation between the first projection photograph and the second position photograph according to the at least one predetermined compensation method without establishing the change in truncation and/or without checking whether a truncation exists.

Embodiments provide where a change in truncation between the datasets may be identified on the basis of predefined change features. A simple and robust capture of a change in truncation may thus be enabled.

One development provides that a respective one of the datasets includes sensor data captured by a sensor apparatus during the generation of the projection photographs of the respective dataset. In other words, it is provided that sensor data is added to the dataset, which data was captured by the sensor apparatus as the projection photographs of the respective dataset were created. The sensor apparatus may include, for example, internal sensor units of the CT apparatus and/or external sensor units, that are not part of the CT apparatus. The sensor apparatus may include, for example, a camera for capturing a position of the examination object during the capture of the projection photographs. The at least one predefined change criterion may relate to a predefined change between the sensor data of the datasets. In other words, it is provided that the control facility establishes the change in truncation when differences between the sensor data of the datasets satisfy the predefined change criterion. It may be provided, for example, that the predefined change criterion relates to a predetermined change in the examination object position captured by the sensor apparatus.

One development provides that the sensor data of the datasets includes an examination object position of the examination object, captured by the sensor apparatus, during the generation of the projection photographs of the respective dataset. In other words, it is provided that the sensor apparatus ascertains the respective examination object position, which the examination object has during the respective generation of the projection photographs by the CT apparatus. The examination object position may relate, for example, to a position of the examination object in relation to the CT apparatus or a movement trajectory of the capture facility of the CT apparatus. The examination object position captured by the sensor apparatus may be added to the respective sensor data of the respective dataset. It is provided that the at least one predefined change criterion includes a predefined change in the examination object position of the examination object between the datasets. In other words, it is provided that the at least one predefined change criterion describes a predefined change in the examination object position of the examination object, captured by the sensor apparatus, between the first and the second datasets. The predefined change criterion may be satisfied, for example, if the examination object position has turned by more than a predetermined angle between the projection photographs and/or has been displaced by more than a predetermined amount. The development results in the advantage that a change in truncation may be identified on the basis of the predetermined change in the examination object positions of the examination object captured by the sensor apparatus.

One development provides that the sensor data of the datasets includes a sub-object position of a sub-object, captured by a sensor, during the generation of the projection photograph of the respective dataset. In other words, it is provided that the sensor apparatus captures the sub-object position of the sub-object when taking the projection photographs of the respective dataset. The captured sub-object position is added to the corresponding dataset. The sub-object may be, for example, an implant, a medical instrument or a holder, which is provided to hold the examination object in a predetermined position. The sub-object may be an object independent of the examination object and be arranged, for example, in or on the examination object. The sub-object may also be arranged to be spaced apart from the examination object. The sub-object may also be a predetermined object of the examination object. It may be, for example, a limb of the examination object. The sub-object position, which was captured by the sensor apparatus, may be added to the respective dataset. It is provided that the at least one predefined change feature includes a change in the sub-object position of the sub-object between the datasets. In other words, it is provided that the change in truncation is established if the sub-object position of the sub-object between the datasets satisfies the predefined change criterion. The predefined change criterion may be satisfied, for example, if the sub-object position has turned by more than a predetermined angle between the projection photographs and/or has been displaced by more than a predetermined amount. The change in truncation may thus be identified on the basis of the identification of the change in the sub-object position of the sub-object. This results in the advantage that the change in truncation of the examination object, which is induced on an at least partial change in a shadowing effect of the examination object due to the sub-object in at least some of the projection photographs, is captured.

One development provides that the sensor data of the datasets includes a holding apparatus position, captured by the sensor apparatus, of a holding apparatus for holding the examination object during the generation of the projection photographs of the respective dataset. In other words, a respective one of the datasets includes the holding apparatus position of the holding apparatus for holding the examination object. The holding apparatus position of the holding apparatus may include, for example, a height, captured by a sensor unit, of a table on which the examination object is resting. It is provided that the at least one predefined change criterion includes a change in the holding apparatus position of the holding apparatus between the datasets. In other words, it is provided that a change in truncation is identified if the change in the holding apparatus position of the holding apparatus satisfies the predetermined change criterion. It may be provided, for example, that the truncation is established if a height of a table for resting on, on which the examination object rests during the capture of the projection photographs, has changed by a value which overshoots a predetermined threshold value.

One development provides that a respective one of the datasets includes a capture trajectory of a capture apparatus of the CT apparatus. In other words, the trajectory, which the capture apparatus travels in the respective measuring process in order to capture the projection photographs of the respective dataset, is captured and added in the corresponding dataset. The trajectory of the respective dataset may describe, for example, a path on which the X-ray source and/or the capture screen have moved during capture of the projection photographs of the dataset. The trajectory may include individual items of setting data of the capture apparatus during the capture of the respective projection photographs. The trajectory may be based, for example, on the CT apparatus or the examination object. The at least one predefined change feature includes a predefined change criterion relating to a change in the trajectory of the capture facility between the datasets. In other words, the predefined change feature relates to a predetermined change between the trajectories of the capture facility of the datasets. The predefined change feature may predefine, for example, that the courses of the trajectories have a predetermined spatial distance from each other. It is thus possible to take account of the fact that the truncation between the datasets may differ owing to the change in the trajectory.

One development provides that the control facility generates a respective reconstruction mapping of the respective dataset from the projection photographs of the respective dataset according to a predetermined reconstruction method. In other words, it is provided that the respective reconstruction mappings of the examination object are generated from the projection photographs of the respective datasets according to the predetermined reconstruction method. It may be provided, for example, that a two-dimensional reconstruction or a three-dimensional reconstruction is reconstructed as a reconstruction mapping from the projection photographs of the respective dataset.

One development provides that according to a predetermined ascertainment method, at least one reconstruction feature of the reconstruction mapping of the respective dataset is ascertained, and the at least one predefined change criterion includes a predefined change between the reconstruction features of the reconstruction mappings of the datasets. It is provided that the at least one predefined change criterion includes a change in at least one reconstruction feature between the reconstruction mappings. In other words, it is provided that the change in truncation is established if a change between the reconstruction feature of the reconstruction mapping of the first projection photographs and the reconstruction feature of the reconstruction mapping of the second projection photographs satisfies the at least one predefined change criterion. The reconstruction feature may relate, for example, to a value range of the Hounsfield values of the respective reconstruction mapping or to a shape of the examination object captured in the reconstruction mappings or to a predefined reference structure. The predefined change criterion may describe, for example, overshooting of a threshold value of a change in the average Hounsfield values of the reconstruction mappings. The development results in the advantage that the change in truncation may be established on the basis of changes in the reconstruction mappings.

One development provides that the at least one reconstruction feature includes an examination object position of the examination object in the reconstruction mapping. In other words, it is provided that the control facility ascertains the examination object position of the examination object in the respective reconstruction mapping of the respective dataset. The examination object positions of the examination object ascertained for the respective datasets are compared with each other by the control facility. If the change in the examination object position of the examination object in the reconstruction mappings satisfies the at least one predefined change criterion, the control facility establishes the change in truncation.

One development provides that the at least one reconstruction feature includes a sub-object position and/or a presence of at least one further sub-object in the reconstruction mapping. In other words, it is provided that in the respective reconstruction the control facility ascertains the sub-object position of the at least one further sub-object or the presence of the sub-object in the reconstruction mapping. If the change in the sub-object position of the sub-object in the reconstruction mappings satisfies the at least one predefined change criterion, the control facility establishes the change in truncation.

In addition, or as an alternative, the at least one predefined change feature may relate to a change in the presence of the sub-object between the reconstruction mappings.

One development provides that the control facility identifies, according to a predetermined identification method, at least one predetermined reference structure in the respective reconstruction mappings according to a predetermined identification method. In other words, it is provided that the control facility evaluates the reconstruction mapping of the respective dataset according to the predetermined identification method in order to identify the at least one predetermined reference structure in the respective reconstruction mappings. The reference structure may be, for example, a predefined volume or a predefined area of the examination object and/or of the sub-object, which may be identified in the respective reconstruction mappings. The identification method may include an image identification method according to the prior art and be configured to identify the reference structure on the basis of predefined area features, volume features, position features or intensity values in the respective reconstruction mapping. The control facility ascertains a Hounsfield feature of the reference structure in the respective reconstruction mapping from at least one Hounsfield value of the reference structure. In other words, the control facility determines the Hounsfield feature of the reference structure for each of the reconstruction mappings. The Hounsfield feature may depend on at least one or more Hounsfield value(s) of the reference structure and describe, for example, an average value of the Hounsfield values of the reference structure, a largest Hounsfield value of the reference structure or a smallest Hounsfield value of the reference structure in the respective reconstruction mapping.

One development provides that the at least one predefined change criterion includes a predefined change between the at least one Hounsfield feature of the reference structure of the reconstruction mappings of the respective datasets. The at least one change criterion may include a change in the Hounsfield feature between the reference structure in the reconstruction mappings. In other words, it is provided that the at least one predefined change feature includes a predetermined change in the Hounsfield feature of the reference structure between the datasets. It may be provided, for example, that the predefined change criterion includes a change in the Hounsfield feature of the reference structure above a predetermined threshold value. The development results in the advantage that the change in truncation may be identified by monitoring a predetermined reference structure. It may be provided, for example, that the reference structure may be a volume of the object for which it may be assumed that its absorption behavior does not change between the acquisitions of the projection photographs of the datasets. It may be, for example, a volume which is not affected by the contrast agent, for example owing to its position or its material. Owing to this property, the reference structure may be used to capture the change in truncation because it may be highly probably assumed that the change in the Hounsfield feature of the reference structure may be attributed to a change in truncation and not to other causes.

One development provides that the at least one predetermined compensation method includes inserting a compensation volume into a truncation model of the predetermined reconstruction method for reconstruction of the reconstruction mapping from the projection photographs of at least one of the datasets. In other words, it is provided that effects of the truncation is compensated in at least one of the datasets in that the truncation model is adapted for reconstruction of the reconstruction mapping of the respective dataset.

One development provides that the adaptation of the truncation model includes inserting a compensation volume into the truncation model of at least one of the datasets. It is provided that a differential absorption, caused by the compensation volume, in the reconstruction of the reconstruction mapping is taken into account in the predetermined reconstruction method. Inserting the compensation volume may compensate a differential absorption in the reconstruction mapping caused by a volume not captured by the projection photographs of the dataset. In other words, it may be provided that a volume captured in the projection photographs of the first dataset is not captured in the projection photographs of the second dataset. Owing to the absence of the volume in the second dataset, the absorption of the beams that has occurred in the volume is not taken into account in the reconstruction of the reconstruction mapping of the second dataset, whereby the Hounsfield values may differ between the reconstruction mappings of the datasets. The absorption of the beams by the non-captured volume may be taken into account by insertion of the compensation volume.

One development provides that the at least one predetermined compensation method includes a displacement of the examination object in a truncation model of the predetermined reconstruction method for generating the reconstruction mapping from the projection photographs of at least one dataset. In other words, it may be provided that the examination object position of the examination object has changed between the measurements without this having been captured in the respective projection photographs. This may result in a truncation owing to an incorrect truncation model. The absorption of the beams by the examination object may be taken into account due to the change in the examination object position of the examination object in the truncation model.

One development provides that the predetermined compensation method includes a correction of the Hounsfield values of the reconstruction mapping of at least one of the datasets as a function of the Hounsfield feature of the reference structure of the reconstruction mapping. In other words, it is provided that the Hounsfield values of at least one of the reconstruction mappings, which were generated from the projection photographs of one of the datasets, are corrected. It is provided that the Hounsfield values of the reconstruction mapping is changed as a function of the Hounsfield feature of the reference structure of the respective reconstruction mapping. It may be provided, for example, that at least the Hounsfield feature of the reference structure of the reconstruction mapping is set as a reference for the Hounsfield values of the relevant reconstruction mapping. The Hounsfield values of the reconstruction mapping may also change as a function of the Hounsfield feature of the reference structure of the reconstruction mapping of the other dataset. In accordance with the Hounsfield features of the respective reference structures of the reconstruction mappings, the Hounsfield values of the reconstruction mappings may be displaced, for example, by an offset value. This results in the advantage that Hounsfield values of the reconstruction mappings may be aligned with the respective datasets. The reference structure may be an element that is not affected by added contrast agent or is affected to only a slight extent. It may be, for example, a bone, an instrument, or a different object.

For specific applications or application situations that may result with the method and that are not explicitly described here, it may be provided that, according to the method, an error message and/or a request to input a user acknowledgement is output and/or a standard setting and/or a predetermined initial state is set.

A second aspect relates to a control facility, that is configured to identify a change in truncation of an examination object between first projection photographs of the examination object generated by a CT apparatus, and second projection photographs of the examination object generated by the CT apparatus. The control facility is configured to receive a first dataset, that includes the first projection photographs of the examination object. The control facility is configured to receive a second dataset, that includes the second projection photographs of the examination object. The control facility is configured to correlate the first dataset with the second dataset. The control facility is configured to establish a change in truncation between the first projection photographs of the first dataset and the truncation of the second projection photographs of the second dataset when satisfaction of at least one predefined change criterion between the datasets is captured. The control facility is configured to emit a predetermined output signal about the change in truncation between the first projection photographs of the first dataset and the second projection photographs of the second dataset when the change in truncation is established.

In addition, or as an alternative, the control facility is configured to compensate the change in truncation between the first projection photographs and the second projection photographs according to a predetermined compensation method.

The control facility may contain, for example, one or more computer(s), one or more microcontroller(s) and/or one or more integrated circuit(s), for example one or more application-specific integrated circuit(s), ASIC, one or more field-programmable gate array(s), FPGA, and/or one or more system(s) on a chip, SoC. The computing unit may also contain one or more processor(s), for example one or more microprocessor(s), one or more central processing unit(s), CPU, one or more graphics processing unit(s), GPU, and/or one or more signal processor(s), for example one or more digital signal processor(s), DSP. The computing unit may also include a physical or a virtual group of computers or others of said units.

A third aspect relates to a CT apparatus, that includes a control facility according to the second aspect. The control facility may also be configured to actuate the CT apparatus in order to capture the first projection photographs from an examination object of the first dataset and in order to capture the second projection photographs from the examination object of the second dataset.

A fourth aspect relates to a computer program, that may be directly loaded into a memory of a control facility, having program code in order to carry out the steps of the above-mentioned method when the program is executed in the control facility. The method described herein may therefore also be in the form of a computer program product, that implements the method on a control unit when it is executed on the control unit.

A fifth aspect relates to an electronically readable data carrier having electronically readable items of control information stored thereon, that include at least one described computer program and are configured in such a way that they carry out a described method when the data carrier is used in a control facility.

DETAILED DESCRIPTION

Figure 1:
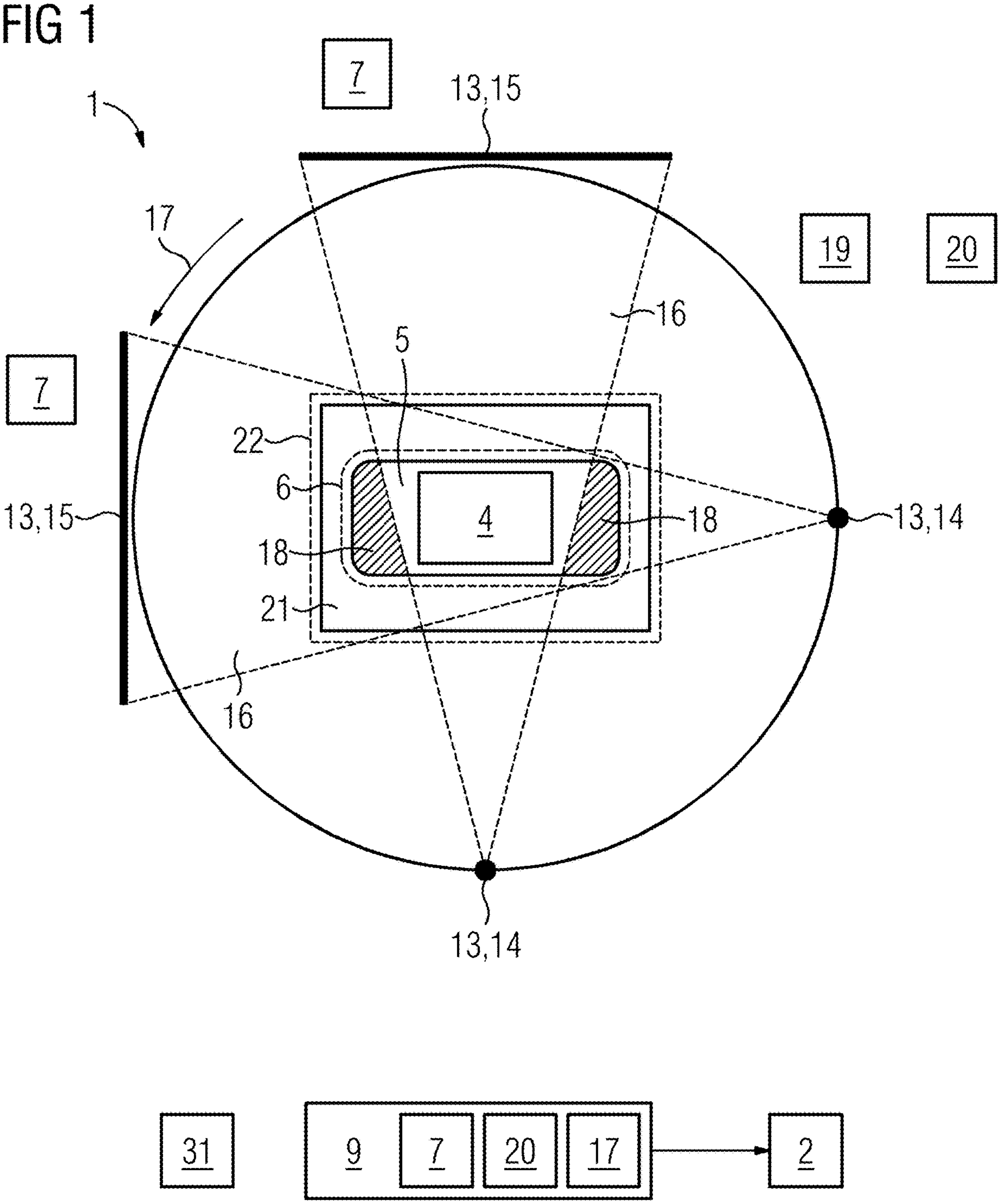
FIG. 1 depicts a schematic representation of capture of first projection photographs of an examination object by a CT apparatus according to an embodiment.

FIG. 1 depicts a schematic representation of capture of first projection photographs 7 of an examination object 5 by a CT apparatus 1.

The CT apparatus 1 may be configured to carry out a cone beam computed tomography method to be able to generate a reconstruction mapping 2,3 of an examination object 5. The CT apparatus 1 may include a control facility 33, that may be configured to subtract a reconstruction mapping 2,3 of the examination object 5, that is formed from first projection photographs 7 of a first dataset 9, from a reconstruction mapping 2,3 of the examination object 5, that is formed from second projection photographs 8 of a second dataset 10. The reconstruction mapping 2 of the first dataset 9 may show the examination object 5 before an injection of a contrast agent 12, while the reconstruction mapping 3 of the second dataset 10 may show the examination object 5 after the injection of the contrast agent 12. The reconstruction mapping 2 of the first dataset 9 may thus be a mask, while the reconstruction mapping 3 of the second dataset 10 may be a full image.

The CT apparatus 1 may include a capture facility 13, that may include an X-ray source 14 and a capture screen 15. The X-ray source 14 may be configured to irradiate X-rays along a cone volume in the direction of the capture screen 15. The examination object 5 may be arranged between the X-ray source 14 and the capture screen 15. The X-rays are absorbed by the examination object 5, whereby the capture screen 15 captures a two-dimensional projection photograph of the examination object 5. A reconstruction of the reconstruction mapping 2,3 of the examination object 5 requires taking a large number of projection photographs 7,8 of the examination object 5 from different directions. For this the CT apparatus 1 may be configured to move the capture facility 13 around the examination object 5 along a, for example circular, trajectory 17. The respective first projection photographs 7 of the examination object 5 are captured in predetermined directions and added to the first dataset 9. The control facility 33 may be configured to reconstruct the reconstruction mapping 2 of the first dataset 9 from the first projection photographs 7 of the first dataset 9 according to a predetermined reconstruction method.

Ideally, the examination object 5 is located inside the cone 16 every time the respective first projection photographs 7 are taken, so the examination object 5 is fully radiographed, and the projection photograph includes the examination object 5 over an entire respective dimension. The case may exist, however, where, at least in some settings of the capture facility 13, missing areas 18 of the examination object 5 lie outside of the cone 16 and these are thus not captured by the respective first projection photograph. What is known as a truncation exists in this case. Errors may consequently result in the reconstruction mapping 2,3 of the examination object 5, that may lead to incorrect Hounsfield values in the reconstruction mappings 2,3.

The CT apparatus 1 may include a sensor apparatus 19, that is configured to capture a position of the examination object 5, of a sub-object 24, of a holding apparatus 21. The sensor may include, for example, a camera and a position detector of the holding apparatus 21. The sensor apparatus 19 may add the positions to the first dataset 9.

Figure 2:
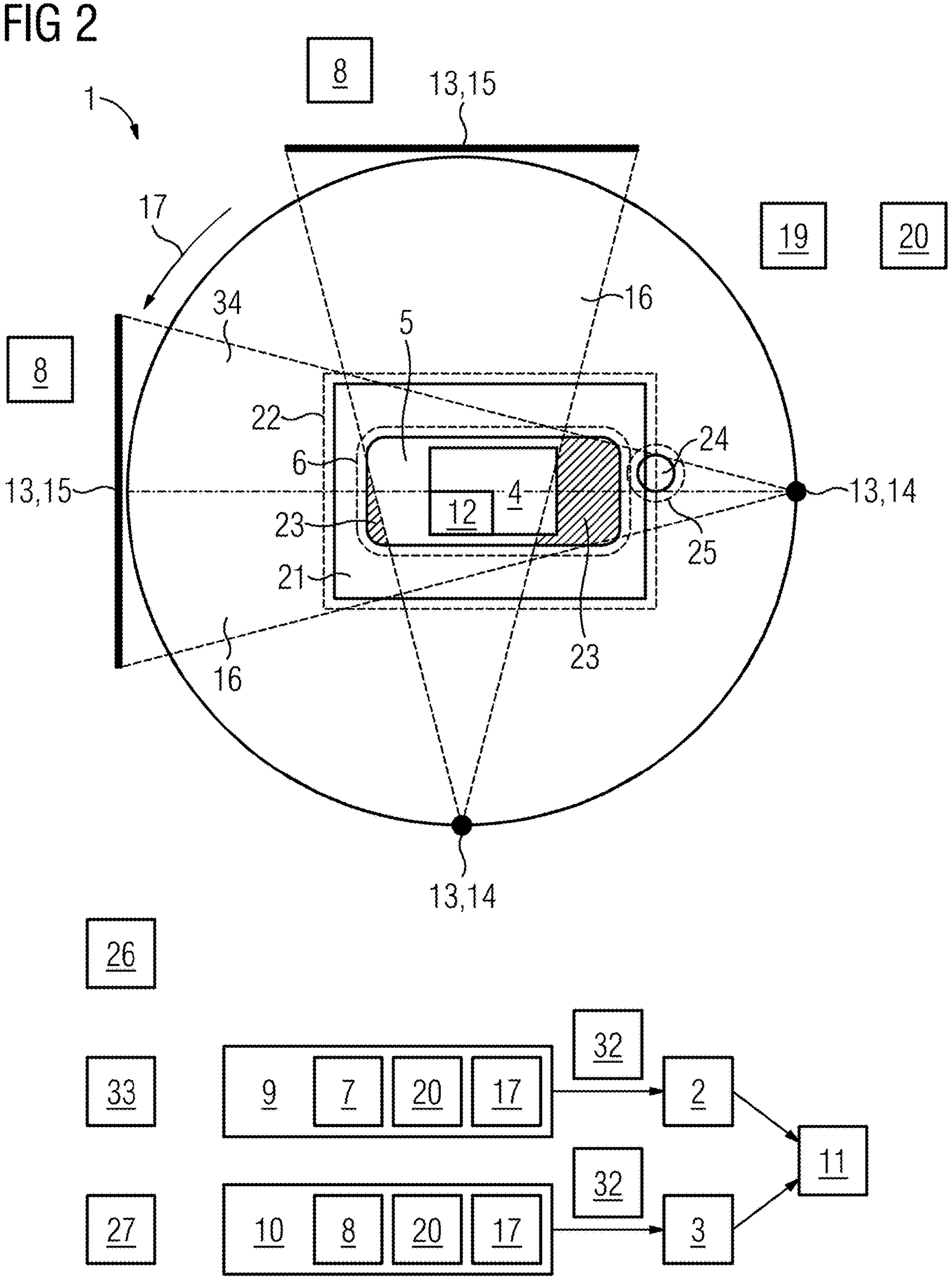
FIG. 2 depicts a schematic representation of capture of second projection photographs of the examination object by the CT apparatus according to an embodiment.

FIG. 2 depicts a schematic representation of capture of second projection photographs 8 of the examination object 5 by the CT apparatus 1.

Shown is the CT apparatus 1 represented in FIG. 1 during capture of the second projection photographs 8 of the examination object 5 for the second dataset 10. The examination object 5 may include a contrast agent 12, that may be located inside the region of interest. The second projection photographs 8 may be captured analogously to the capture of the first projection photographs 7. The object position of the examination object 5 during capture of the second projection photographs 8 by the CT apparatus 1 may differ from the object position of the examination object 5 during capture of the first projection photographs 7 by the CT apparatus 1. During capture of the second projection photographs 8 other missing areas 18, 23 may thus lie outside of at least one cone 16 when taking at least one of the second projection photographs 8. In addition, a sub-object 24 may be located in one of the cones 16, which at least partially absorbs beams of the cone 16 and consequently shadows part of the cone 16.

The sensor apparatus 19 may capture the positions of the examination object 5, and of the sub-object 24 and add them to the second dataset 10. Owing to the changed position of the examination object 5, that results in separation of a different missing area 23 than in the first dataset 9, the shadowing effect due to the sub-object 24, a different truncation exists than in the first dataset 9. Hounsfield values of the reconstruction mapping 3 of the second dataset 10 may consequently deviate from Hounsfield values of the reconstruction mapping 2 of the first dataset 9. The change in the Hounsfield values may result in an undesirable offset in the case of the subtraction of the reconstruction mappings 2,3 in order to generate reconstruction mapping 11.

Figure 3:
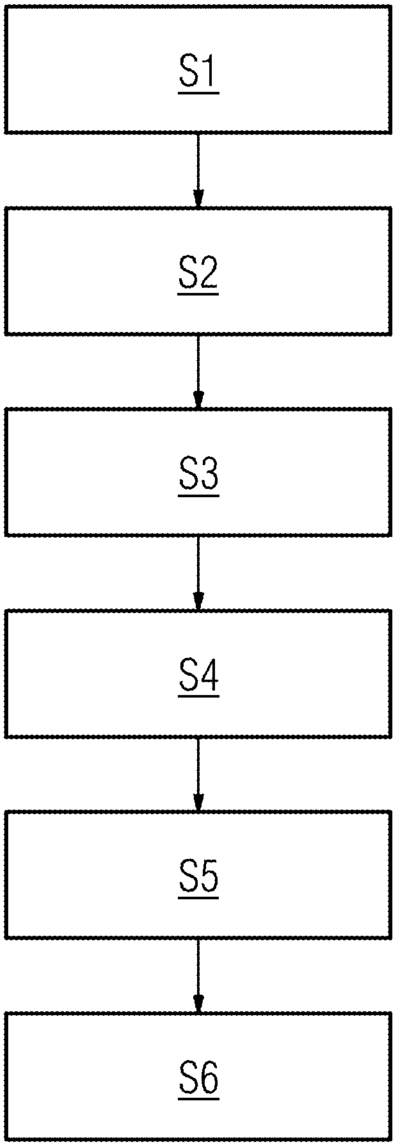
FIG. 3 depicts a schematic representation of a sequence of a method according to an embodiment.

FIG. 3 depicts a schematic representation of a sequence of a method.

The method may be carried out by a control facility 33 and be provided for identifying a change in truncation of an examination object 5 between first projection photographs 7,8 of the examination object 5 generated by a CT apparatus 1, and second projection photographs 7,8 of the examination object 5 generated by the CT apparatus 1.

In a first step S1, the control facility 33 may be provided with a first dataset 9, including the first projection photographs 7 of at least one region of interest of the examination object 5 to be examined. The control facility 33 may receive the dataset 9,10. The control facility 33 may generate a reconstruction mapping 2 of the first dataset 9 from the first projection photographs 7 by applying a truncation model 32 according to a predetermined reconstruction method. The first projection photographs 7 may have been captured by a CT apparatus 1 in a cone beam computed tomography rotation scan. The first dataset 9 may include the first projection data and/or external sensor data 20, that was captured by a sensor during capture of the first projection data.

In a second step S2, the control facility 33 may be supplied with a second dataset 10 10, including the second projection photographs 8 of the at least one region of interest of the examination object 5 to be examined. The control facility 33 may receive the second dataset 10. The control facility 33 may generate a reconstruction mapping 3 of the second dataset 10 from the second projection photographs 8 by applying the truncation model 32 according to a predetermined reconstruction method. The second projection photographs 8 may have been captured by a CT apparatus 1 in a cone beam computed tomography rotation scan. The second dataset 10 may include the second projection data and/or external sensor data 20, that was captured by the sensor apparatus 19 during capture of the second projection photographs 8.

In a third step S3, the first dataset 9 may be correlated with the second dataset 10 by the control facility 33. The first dataset 9 may be registered as a mask and the second dataset 10 as a full image. Changes between the datasets 9,10 may be ascertained in the method step, which changes may enable identification of a change in truncation between the datasets 9,10.

In a fourth step S4, the control facility 33 may establish a change in truncation between the first projection photographs 7 and the second projection photographs 8 if at least one predefined change criterion 26 between the datasets 9,10 is satisfied. In other words, it is provided that the control facility 33 checks whether the changes between the datasets 9,10 satisfy the at least one change criterion 26.

The change criteria 26 may relate to different changes between the datasets 9,10, that may point to a change in truncation.

The predetermined change criteria 26 may be linked to a 2D object identification in the projection photographs 7,8.

At least one of the change criteria 26 may relate to a change in a sub-object position 25 of a sub-object 24 or a presence of the sub-object 24.

The at least one sub-object 24 may include an arm. Arms may be positioned in different ways in mask and full images. With abdominal scans they almost always lie outside of a reconstruction volume. The at least one sub-object 24 may include a skin surface. The at least one sub-object 24 may include an object of the examination object 5, that normally cannot be deformed. The sub-object 24 may include an element of a holding apparatus 21 for holding the examination object 5, such as a table. The sub-object 24 may be a contrast-rich mapped object, that may be identified in projection photographs 7,8. It may include tubes, wires, or instruments.

The predetermined change criteria 26 may relate to changes that may be identified in the main volume of the three-dimensional reconstruction mapping 2,3 by image analysis.

An identification and/or recognition of at least one reference structure 28 may be provided that is not affected by the injection of contrast agent. The control facility 33 may register the corresponding reference structure 28 in the reconstruction mapping 2,3 of the respective datasets 9,10. The control facility 33 may ascertain respective Hounsfield features 29 of the two corresponding reference structures 28 and compare them with each other. If the truncation has remained constant, the Hounsfield feature 29 of the reference structure 28 in the two reconstruction mappings 2,3 should be almost identical. It may be provided that one of the change criteria 26 is satisfied if the change in the Hounsfield feature 29 between the datasets 9,10 overshoots a predefined threshold value.

One of the predetermined Hounsfield features 29 may relate to a change in sub-object positions 25 and/or movements of predetermined sub-objects 24, that are located outside of a region of interest 4, for example outside of a soft tissue organ. It may be, for example, bones or a skin surface.

It may be provided that the change in truncation is identified on the basis of sensor data 20 of the datasets 9,10. A camera-based identification of a change in the examination object position 6 of the examination object 5, for example owing to patient movements, may take place on the basis of the sensor data 20 of the respective datasets 9,10. It may also relate to a change in sub-object position or to a change in the presence of one of the sub-objects 24. The change in sub-object position may be induced by a placement, removal, movement of the sub-object 24. The sub-object 24 may relate to instruments, cloths, tubes, devices outside of the examination object 5, that are located in the beam path of some projection photographs 7,8. The sensor data 20 may include a holding apparatus position 22 of a holding apparatus 21.

In a fifth step S5, the control facility 33 may carry out a predetermined compensation method in order to compensate the change in truncation between the projection photographs 7,8. In contrast to the prior art, a differential truncation correction may take place, that may depend on the change criterion 26 that has been satisfied.

The application of the compensation method may include an evaluation of a size of an applied correction, that may be described in the output signal 27. In principle it is also possible that the control facility 33 applies an application of the most modern methods in order to assess and/or correct the absolute truncation, as is customary according to the prior art. For the given case it is known that the absolute truncation correction sometimes does not function accurately enough to define, for example, a correct base line of the Hounsfield values in the two reconstruction mappings 2,3. One of the change criteria 26 may relate, for example, to a predetermined change in the ascertained base lines between the datasets 9,10. Instead of being provided for compensation of the change in truncation, the methods for absolute truncation correction according to the prior art may thus be provided for ascertaining an indicator, that may enable identification of a change in truncation between the datasets 9,10.

The compensation method configured as a differential truncation correction method may be provided to circumvent the highly complex challenges of absolute truncation correction methods in that only small differential compensations of the change in truncation between the, in this case for example almost identical, datasets 9,10 are compensated. This simplifies the problem considerably since it may be assumed that the scanned examination object 5, that is captured in the first projection photographs 7 and the second projection photographs 8, is almost identical apart from the contrasting agent.

What might have changed is, for example, an imaging geometry. The imaging geometry may, for example, owing to a change in the holding apparatus position 22 of a holding apparatus 21 for holding the examination object 5 between capture of the first projection photographs 7 and capture of the second projection photographs 8. The change in the holding apparatus position 22 may be, for example, a change in a position of a table on which the examination object 5 is arranged. The imaging geometry may change owing to a change in a capture trajectory 17 of a capture apparatus of the CT apparatus 1 between capture of the first projection photographs 7 and capture of the second projection photographs 8. The change in the capture trajectory 17 may be a change in a C-arm scan trajectory 17 in relation to the examination object position 6 of the examination object 5.

A change may be a placement, removal, or a change in a sub-object position 25 of a sub-object 24. The sub-object 24 may be an external object, that is independent of the examination object 5. A change may relate to the examination object position 6 itself, for example a patient, that cannot be attributed to the injection or administering of the contrast agent 12.

As the control facility 33 may ascertain the type of change in the fourth step S4 by capture of the satisfaction of the at least one change criterion 26, the control facility 33 may further isolate the cause of change in truncation in order to carry out the compensation method, configured as a differential truncation correction method, as a function of the change criterion 26 that has been satisfied.

One possible compensation method will be described below. For example, a change in truncation owing to a change in the mapping geometry between generation of the first projection photographs 7 and generation of the second projection photographs 8 may be compensated with an almost stable examination object 5. It may be assumed in this case that neither a shape nor the examination object position 6 has changed between capture of the projection photographs 7,8 of the respective dataset 9,10.

Firstly, the reconstruction mappings 2,3 reconstructed by the control facility 33 from the projection photographs 7,8 according to the predetermined reconstruction method may be spatially related to each other for the purpose of compensation. This may take place via the geometry predefined by the capture apparatus, it being possible for the capture apparatus to be configured, for example, as a C-arm. The geometry may include, for example, the capture trajectory 17 of the capture apparatus of the CT apparatus 1 during generation of the projection photographs 7,8 of the respective dataset 9,10. Forming a spatial relationship relative to each other may also be image-based, based on the reconstruction mappings 2,3 and/or the projection photographs 7,8 of the respective datasets 9,10.

Reconstruction mappings 2,3, that are reconstructed from projection photographs 7,8 with truncations, that were generated by cone beam computed tomography methods, are usually reconstructed in that, for example, a cylinder model or a different truncation model 32 of the examination object 5 is assumed. The control facility 33 may assume that the reconstruction of the two reconstruction mappings 2,3 uses the same truncation model 32, only that the reconstructed reconstruction mapping 2,3 is positioned differently in the respective truncation model 32 depending on the captured examination object position 6 of the examination object 5. Systematic changes in offset between the two truncation models 32 are consequently avoided. Optionally a compensation volume may be inserted in at least one of the truncation models 32. The compensation volume may describe a reconstructed part of the reconstruction mapping 2,3 that is not located in the field of view of the reconstruction mapping 2,3 of one of the datasets 9,10. A missing compensation volume may likewise be added to the truncation model 32 of the other dataset 9,10 to achieve even greater consistency between the two reconstruction mappings 2,3. The control facility 33 may then reconstruct corrected reconstruction mappings 2,3 from the projection photographs 7,8, that are based on consistent truncation models 32 for both reconstruction mappings 2,3.

The control facility 33 may adapt the Hounsfield values of the reconstruction mappings 2,3 from shared objects and/or object areas that are not affected by the injection of contrast agent. This may relate, for example, to adjacent organs, bones, air, or water. In the region of interest, a Hounsfield unit offset may be applied between measuring points/regions by interpolation.

The compensation may include an application of the movement/change in the anatomy ascertained in the fourth step S4 to the truncation model 32 in order to generate the reconstruction mappings 2,3. If, for example, arms in the reconstruction mapping 2 of the first dataset 9 cause a truncation owing to an induced shadowed area 34 but are not present in the reconstruction mapping 3 of the second dataset 10, the control facility 33 ensures that the truncation model 32 contains arms in order to generate the reconstruction mapping 2 of the first dataset 9 and the truncation model 32 does not include them for the generation of the reconstruction mapping 3 of the second dataset 10. Alternatively, the control facility 33 may calculate or estimate the differential absorption caused by the arms in order to compensate the truncation.

In a sixth step S6, the control facility 33 may output a predetermined output signal 27 about the change in truncation between the first projection photographs 7 and the second projection photographs 8. The predetermined signal may include the ascertained change in truncation. Information about the change in truncation may be stored, used or displayed by a further apparatus due to the output of the predetermined output signal 27. It is possible for example for the further apparatus to display or store whether a change in truncation was established between the two datasets 9,10.

A user may consequently be made aware of the problems occurring due to the change in truncation.

The described method makes greater reliability possible in the capture of the quantitative distribution of iodine or other contrast agents 12 by way of image subtraction.

The described differentiated identification and correction of truncation is more robust and precise than absolute or global corrections.

Figure 4A:
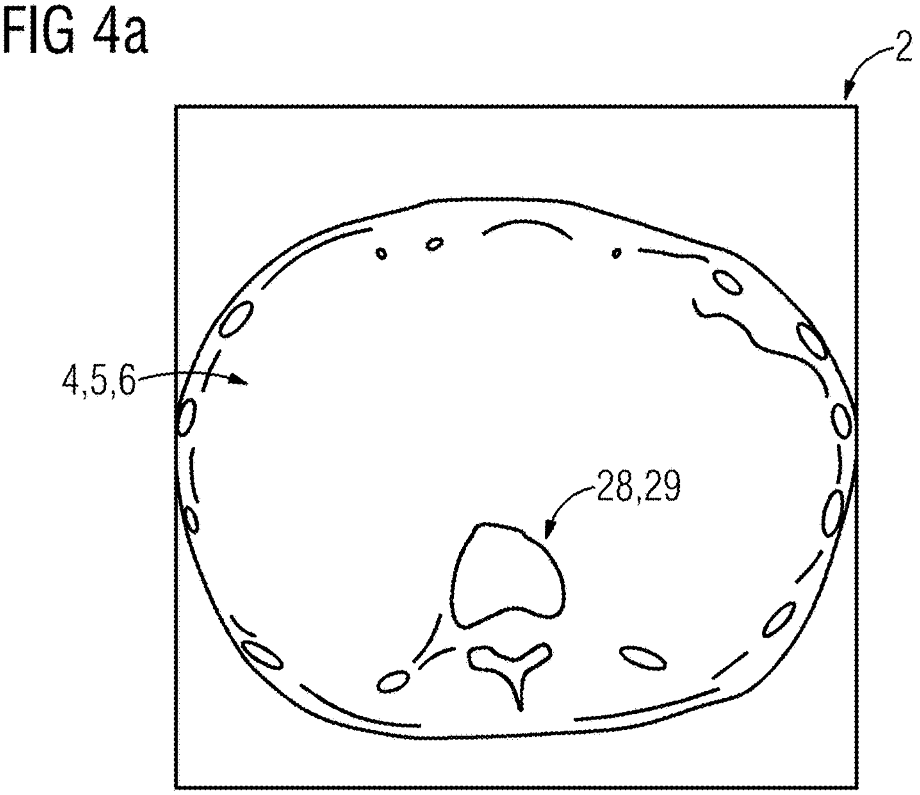
FIGS. 4*a* and 4*b* depict a schematic representation of reconstruction mappings of an examination object according to an embodiment.
Figure 4B:
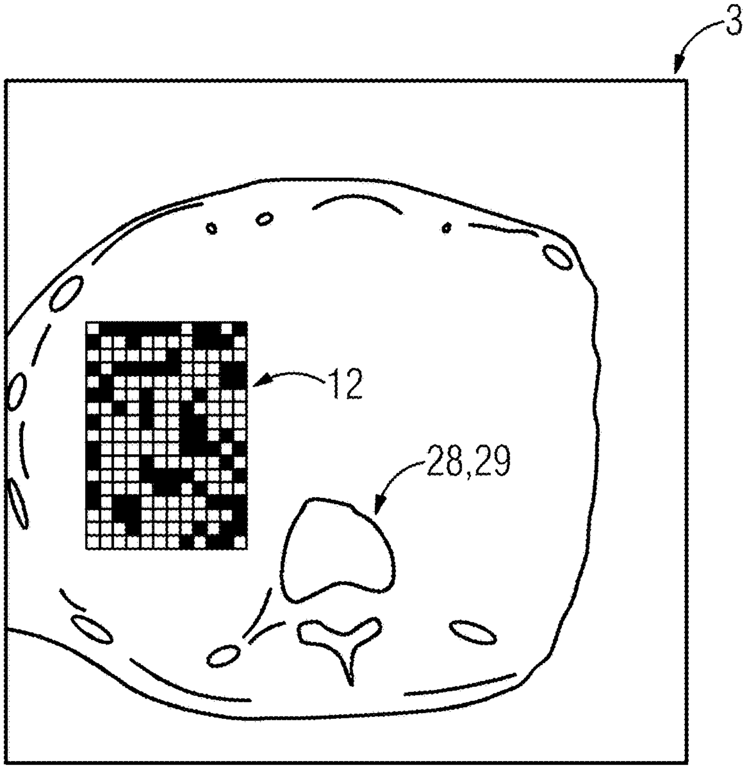

FIG. 4*a* and FIG. 4*b* show a schematic representation of reconstruction mappings 2,3 of an examination object 5.

The reconstruction mapping 2 of the first dataset 9 represented in FIG. 4*a* may show the examination object 5 before an injection of a contrast agent 12.

The reconstruction mapping 3 of the second dataset 10 represented in FIG. 4*b* may show the examination object 5 after injection of the contrast agent 12. Inside the examination object 5 the contrast agent 12 may result in Hounsfield values, that may be differentiated from the surroundings of the contrast agent 12. An examination object position 6 of the examination object 5 when taking the first projection photographs 7 may differ from the examination object position 6 of the examination object 5 when taking the second projection photograph, so it is possible for a truncation to have changed. The change in truncation may result in the Hounsfield values of the two reconstruction mappings 2,3 potentially differing from each other. The reconstruction mappings 2,3 also show reference structures 28, that may be identified in the two reconstruction mappings 2,3 and are not affected by the contrast agent 12. The mapping of the first dataset 9 may be provided as a mask photograph, that is to be subtracted in a subtraction method from the reconstruction mapping 3 of the second dataset 10, provided as a full photograph, in order to highlight the contrast agent 12 in the examination object 5.

Figure 5A:
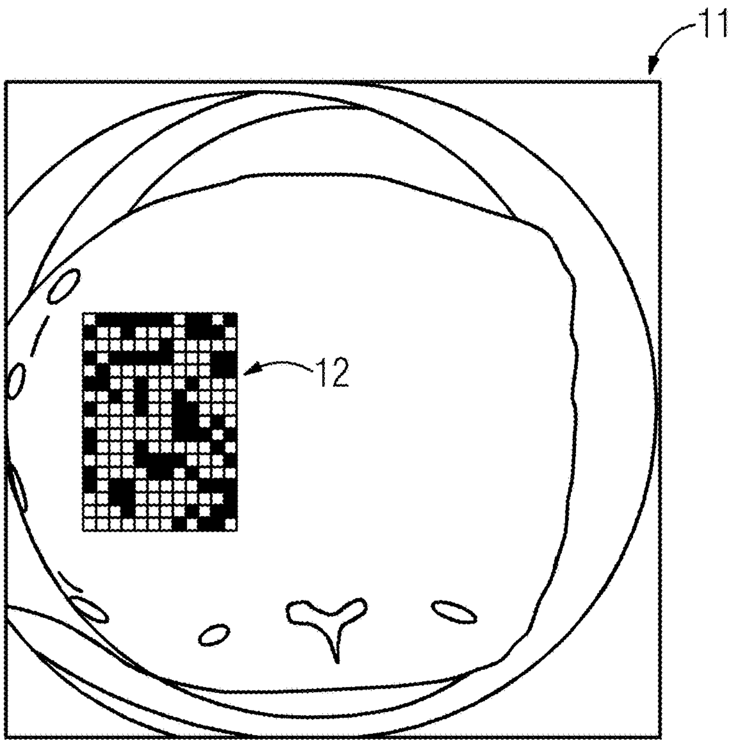
FIGS. 5*a* and 5*b* depict a schematic representation of a reconstruction mapping of the examination object, that is generated from the reconstruction mappings of the datasets according to a predetermined subtraction method according to an embodiment.
Figure 5B:
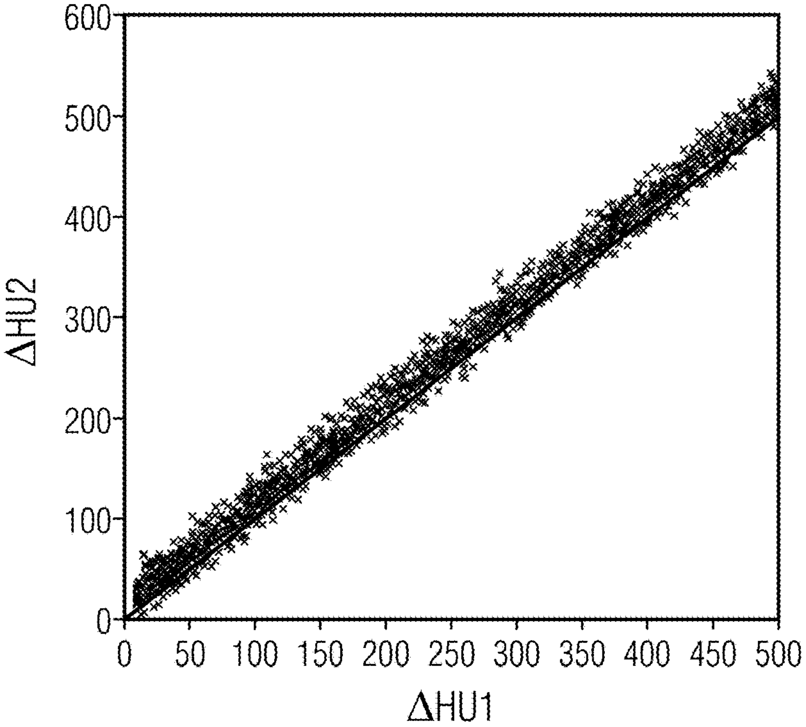

FIG. 5*a* and FIG. 5*b* show a schematic representation of a reconstruction mapping 11 of the examination object 5, that is generated from the reconstruction mappings 2,3 of the datasets 9,10 according to a predetermined subtraction method.

The contrast agent 12, in addition to reconstruction artifacts, may be identified in the reconstruction mapping 11 represented in FIG. 5*a*. Owing to the subtraction, the reference structures 28 identifiable in the reconstruction mappings 2,3 of FIG. 3 may only be faintly identified.

A change between reference Hounsfield values ΔHU1 and ascertained Hounsfield values ΔHU2 results owing to the change in truncation between the datasets 9,10. The change is represented in the diagram shown in FIG. 5*b*, that depicts a displacement of the Hounsfield values with respect to a straight line by an offset.

Figure 6A:
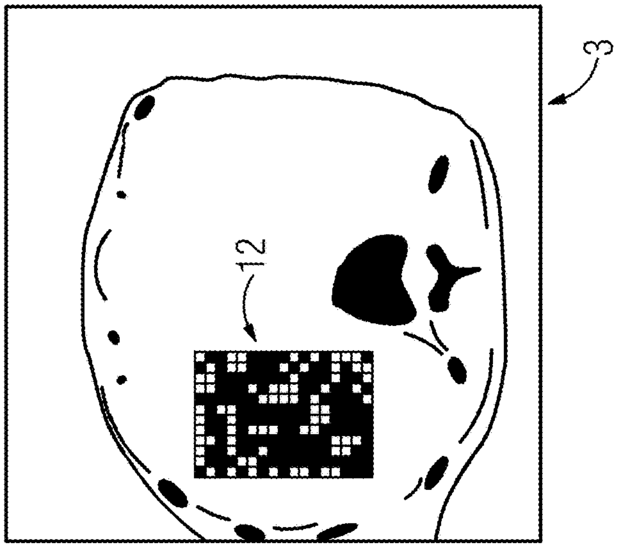
FIGS. 6*a*, 6*b*, and 6*c* depict a schematic representation of an identification of a reference structure identifiable in both reconstruction mappings according to an embodiment.
Figure 6B:
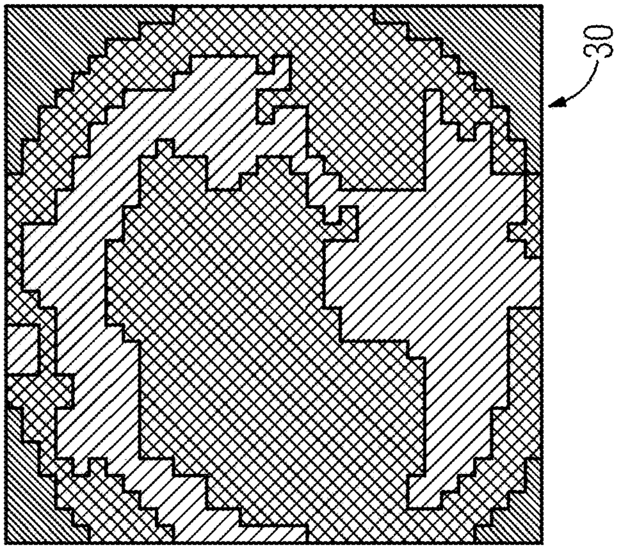
Figure 6C:
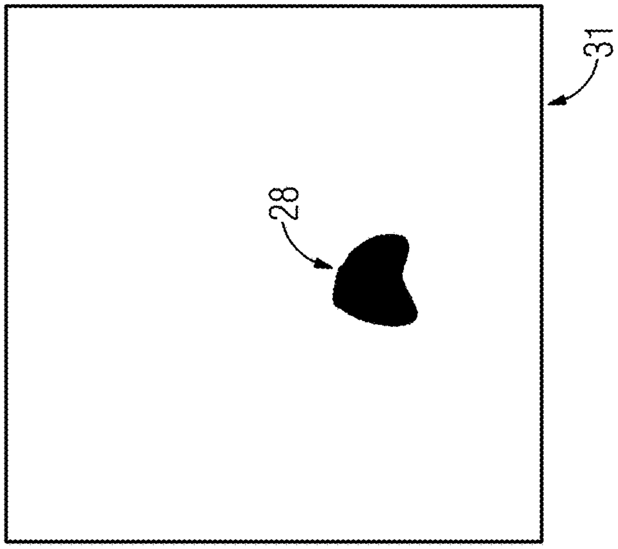

FIG. 6*a*, FIG. 6*b* and FIG. 6*c* show a schematic representation of identification of a reference structure 28 identifiable in the two reconstruction mappings 2,3.

FIG. 6*a* represents a high contrast representation of the reference structure 28, calculated from the reconstruction mapping 3 of the second dataset 10, that is formed by stipulating a threshold value in relation to the Hounsfield values.

FIG. 6*b* depicts a spatial correlation map 30 between the threshold values of the reconstruction mappings 2,3 in which contrast-rich reference structures 28, which are present in both reconstruction mappings 2,3, are highlighted. Regions with contrast fillings, catheters, or artifacts were filtered out in this case.

The depiction in FIG. 6*c* depicts a combination of the maps shown in FIG. 6*b* and FIG. 6*c* in a structure map 31, with the largest reference structure 28 being selected as the reference structure 28. A mean is ascertained from the values of the reference structure 28 for both datasets 9,10. The respective means are deducted from the Hounsfield values of all points of the respective mapping. The offset between the Hounsfield values of the reconstruction mappings 2,3 may be compensated by the use of the reference structure 28.

Figure 7A:
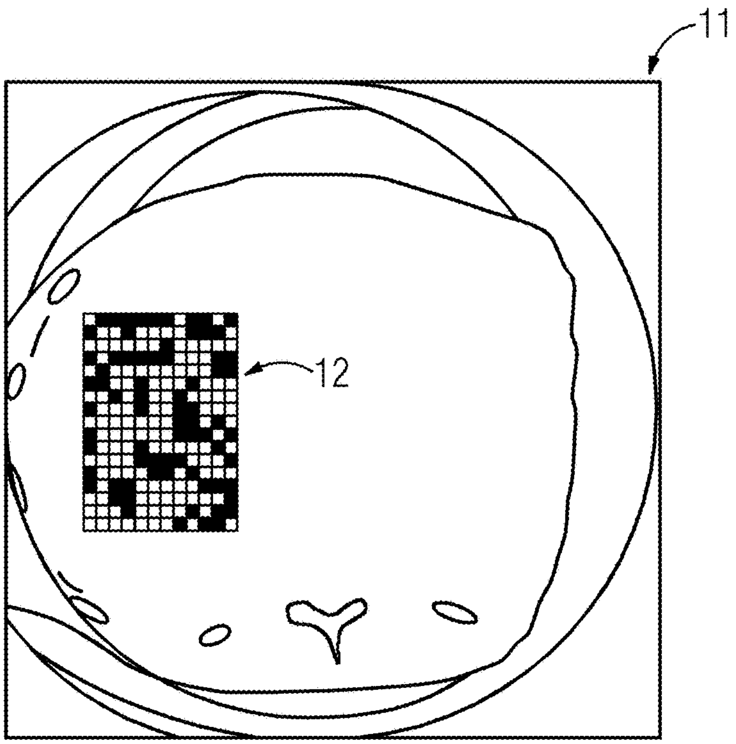
FIGS. 7*a* and 7*b* depict a schematic representation of a reconstruction mapping of the examination object, that is generated from the reconstruction mappings of the datasets according to a predetermined subtraction method according to an embodiment.
Figure 7B:
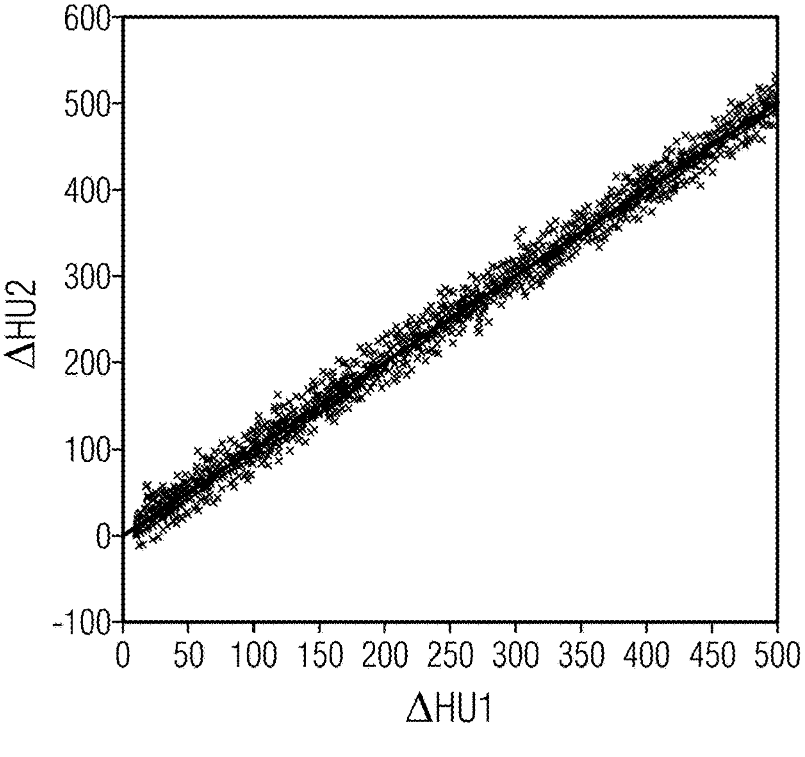

FIG. 7*a* and FIG. 7*b* show a schematic representation of a reconstruction mapping 11 of the examination object 5, which is generated from the reconstruction mappings 2,3 of the datasets 9,10 according to a predetermined subtraction method.

The figure in FIG. 7*a* depicts the reconstruction mapping 11 which is generated according to the predetermined subtraction method from the reconstruction mappings 2,3 of the same datasets 9,10 from which the reconstruction mapping 11 in FIG. 5 was generated. The change between the reference Hounsfield values and the ascertained Hounsfield values, which may be seen in FIG. 5, is suspended owing to the adaptation of the Hounsfield values of the datasets 9,10 as a function of the Hounsfield feature 29 of the reference structure 28 of the respective dataset 9,10. Consequently it is no longer possible to identify an offset between the line and the individual values in the graph shown in FIG. 7*b*.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for identifying a change in truncation of an examination object between first projection photographs of the examination object generated by a CT apparatus, and second projection photographs of the examination object generated by the CT apparatus, wherein the method comprises:

- receiving, by a control facility, a first dataset, comprising the first projection photographs of the examination object;
- receiving, by the control facility, a second dataset comprising the second projection photographs of the examination object;
- correlating, by the control facility, the first dataset with the second dataset;
- establishing, by the control facility, the change in truncation of the examination object between the first projection photographs and the second projection photographs when satisfaction of at least one predefined change criterion between the first dataset and the second dataset is captured; and
- outputting, by the control facility, a predetermined output signal when the change in truncation between the first projection photographs and the second projection photographs is established or compensating the change in truncation between the first projection photographs and the second projection photographs according to a predetermined compensation method.

2. The method of claim 1, wherein a respective one of the first dataset or the second dataset comprises sensor data that is captured by a sensor apparatus during a generation of the first projection photographs and the second projection photographs of the respective dataset, and wherein the at least one predefined change criterion comprises a predefined change between the sensor data of the first dataset and the second dataset.

3. The method of claim 2, wherein the sensor data comprises an examination object position of the examination object captured by the sensor apparatus during the generation of the first projection photographs and the second projection photographs of the respective dataset, and wherein the at least one predefined change criterion comprises a predefined change between the examination object positions of the first dataset and the second dataset captured by the sensor apparatus.

4. The method of claim 2, wherein the sensor data comprises a sub-object position of a sub-object captured by the sensor apparatus during the generation of the first projection photographs and the second projection photographs of the respective dataset, and wherein the at least one predefined change criterion comprises a predefined change between the sub-object positions of the first dataset and the second dataset captured by the sensor apparatus.

5. The method of claim 2, wherein the sensor data comprises a holding apparatus position, captured by the sensor apparatus, of a holding apparatus for holding the examination object during the generation of the first projection photographs and the second projection photographs of the respective dataset, and wherein the at least one predefined change criterion comprises a predefined change between the holding apparatus positions of the first dataset and the second dataset captured by the sensor apparatus.

6. The method of claim 1, wherein a respective one of the first dataset or the second dataset comprises a capture trajectory of a capture apparatus of the CT apparatus during the generation of the first projection photographs and the second projection photographs of the respective dataset, and wherein the at least one predefined change criterion comprises a predefined change between the capture trajectories of the capture apparatus of the CT apparatus of the first dataset and the second dataset.

7. The method of claim 1, wherein a respective reconstruction mapping of the respective dataset is generated from the first projection photographs and the second projection photographs of the respective dataset according to a predetermined reconstruction method.

8. The method of claim 7, wherein at least one reconstruction feature of the reconstruction mapping of the respective dataset is ascertained according to a predetermined ascertainment method, and wherein the at least one predefined change criterion comprises a predefined change between the reconstruction features of the reconstruction mappings of the first dataset and the second dataset.

9. The method of claim 8, wherein the at least one reconstruction feature comprises an examination object position of the examination object in the reconstruction mapping of the respective dataset.

10. The method of claim 8, wherein the at least one reconstruction feature comprises a sub-object position of at least one sub-object, a presence of the at least one sub-object in the reconstruction mapping of the respective dataset, or the sub-object position and the presence of the at least one sub-object.

11. The method of claim 8, wherein at least one predetermined reference structure is identified in the reconstruction mappings of the respective dataset according to a predefined identification method, and wherein at least one Hounsfield feature of the at least one predetermined reference structure of the reconstruction mapping of the respective dataset is ascertained from at least one Hounsfield value of the at least one predetermined reference structure.

12. The method of claim 11, wherein the at least one predefined change criterion comprises a predefined change between the at least one Hounsfield feature of the at least one predetermined reference structure of the reconstruction mappings of the respective datasets.

13. The method of claim 11, wherein the predetermined compensation method comprises an adaptation of a truncation model of the predetermined reconstruction method for reconstruction of the reconstruction mapping of at least one of the first dataset or the second dataset.

14. The method of claim 13, wherein the adaptation of the truncation model comprises inserting a compensation volume into the truncation model of at least one of the first dataset or the second dataset.

15. The method of claim 13, wherein the predetermined compensation method comprises a displacement of an examination object volume of the examination object in the truncation model of at least one of the first dataset or the second dataset.

16. The method of claim 13, wherein the predetermined compensation method comprises a correction of Hounsfield values of the reconstruction mapping of at least one of the first dataset or the second dataset as a function of the Hounsfield feature of the at least one predetermined reference structure of the reconstruction mapping of the respective dataset.

17. A control facility for identifying a change in truncation of an examination object between first projection photographs of the examination object generated by a CT apparatus, and second projection photographs of the examination object generated by the CT apparatus, wherein the control facility is configured to:

receive a first dataset comprising the first projection photographs of the examination object;

receive a second dataset, comprising the second projection photographs of the examination object;

correlate the first dataset with the second dataset;

establish the change in truncation of the examination object between the first projection photographs and the second projection photographs when satisfaction of at least one predefined change criterion between the first dataset and the second dataset is captured; and output a predetermined output signal when the change in truncation between the first projection photographs and the second projection photographs is established or compensate the change in truncation between the first projection photographs and the second projection photographs according to a predetermined compensation method.

18. A non-transitory computer-readable storage medium comprising instructions for identifying a change in truncation of an examination object between first projection photographs of the examination object generated by a CT apparatus, and second projection photographs of the examination object generated by the CT apparatus, the instruction that, when executed by one or more processing units, cause the one or more processing units to:

receive a first dataset, comprising the first projection photographs of the examination object;

receive a second dataset comprising the second projection photographs of the examination object;

correlate the first dataset with the second dataset;

establish the change in truncation of the examination object between the first projection photographs and the second projection photographs when satisfaction of at least one predefined change criterion between the first dataset and the second dataset is captured; and output a predetermined output signal when the change in truncation between the first projection photographs and the second projection photographs is established or compensating the change in truncation between the first projection photographs and the second projection photographs according to a predetermined compensation method.

19. The non-transitory computer-readable storage medium of claim 18, wherein a respective one of the first dataset or the second dataset comprises sensor data that is captured by a sensor apparatus during a generation of the first projection photographs and the second projection photographs of the respective dataset, and wherein the at least one predefined change criterion comprises a predefined change between the sensor data of the first dataset and the second dataset.

20. The non-transitory computer-readable storage medium of claim 19, wherein the sensor data comprises an examination object position of the examination object captured by the sensor apparatus during the generation of the first projection photographs and the second projection photographs of the respective dataset, and wherein the at least one predefined change criterion comprises a predefined change between the examination object positions of the first dataset and the second dataset captured by the sensor apparatus.

* * * * *